United States Patent [19]

Gansner et al.

[11] Patent Number: 4,953,106
[45] Date of Patent: Aug. 28, 1990

[54] TECHNIQUE FOR DRAWING DIRECTED GRAPHS

[75] Inventors: Emden R. Gansner, Morristown; Stephen C. North, Califon; Kiem-Phong Vo, Berkeley Heights, all of N.J.

[73] Assignee: AT&T Bell Laboratories, Murray Hill, N.J.

[21] Appl. No.: 355,731

[22] Filed: May 23, 1989

[51] Int. Cl.$^5$ ............................................. G06F 3/14
[52] U.S. Cl. .................... 364/521; 364/900; 364/188
[58] Field of Search ... 364/200 MS File, 900 MS File, 364/146, 147, 188, 191, 192, 488, 491, 474.23, 474.24, 474.25, 474.27, 518, 521; 340/826, 827

[56] References Cited

U.S. PATENT DOCUMENTS

| | | | |
|---|---|---|---|
| 4,479,196 | 10/1984 | Ferrer et al. | 364/900 |
| 4,674,042 | 6/1987 | Hernandez et al. | 364/401 |
| 4,674,043 | 6/1987 | Hernandez et al. | 364/401 |
| 4,695,976 | 9/1987 | Nakanishi et al. | 364/900 |
| 4,710,763 | 12/1987 | France et al. | 340/731 X |
| 4,752,889 | 6/1988 | Rappaport et al. | 364/188 X |
| 4,829,450 | 5/1989 | Manthey | 364/513 |

OTHER PUBLICATIONS

Lempel et al., *IEEE Trans. Ckt. Theory*, vol. CT-13, No. 4, Dec. 1966, pp. 399–403.
Warfield, *IEEE Trans. On Sys., Man., & Cyber.*, vol. SMC-7, No. 7, Jul. 1977, pp. 505–523.
Sugiyama et al., *IEEE Trans. On Sys. Man. & Cyber.*, vol. SMC-11, No. 2, Feb. 1981, pp. 109–125.
Kernighan, *Software-Practice & Experience*, vol. 12, No. 1, 1982, pp. 1–21.
Eades et al., *ARS Combinatoria*, vol. 21, No. A, 1986, pp. 89–98.
Gansner et al., *Software-Practice & Experience*, vol. 18, No. 11, Nov. 1988, pp. 1047–1062.
Rowe, et al., *Sofware: Practice and Experience*, vol. 17, No. 1, Jan. 1987, pp. 61–76.
Robinson, et al., *Digraphs: Theory & Tech.*, Gordon & Breach Science Pub., 1980, pp. 178–221.

*Primary Examiner*—David L. Clark
*Attorney, Agent, or Firm*—Erwin W. Pfeifle; Richard J. Roddy

[57] ABSTRACT

The present invention relates to a computer-implemented technique for drawing directed graphs providing reduced crossings and improved picture quality. An edge list description provided by a user is processed to produce a ranking of all nodes that minimizes the weighted sum of all edges, an edge cost being the product of its weight and length. Nodes within a ranking are then positioned to reduce edge crossings using a heuristic based on node positions in adjacent ranks. Such heuristic uses a generalized median as a weighting function plus node transposition to avoid senseless edge crossings before proceeding to a next rank. Nodes are then positioned to minimize the weighted sum of horizontal distances among connected nodes. Spline control points are then computed for interconnected nodes, and a code sequence for a drawing is generated.

5 Claims, 8 Drawing Sheets

TECHNIQUE FOR DRAWING DIRECTED GRAPHS

TECHNICAL FIELD

The present invention relates to a technique which is implemented on a processor, computer or microprocessor for drawing directed graphs that provide reduced edge crossings and improved picture quality.

DESCRIPTION OF THE PRIOR ART

Directed graphs are charts or drawings comprising nodes or boxes that are interconnected and are useful for describing relationships. They have applications in computer programming, including the presentation of data structures, data flow, procedure calls, software configuration dependencies, etc. and frequently arise in other disciplines. It is seldom easy to understand a graph from a list of edges. A picture, however, is a good way of representing many kinds of data, including directed graphs, and one can quickly find individual nodes, groups of related nodes, and trace paths in such picture. The main obstacle is that it can be difficult and tedious to make good drawings of graphs by hand, and to make them as simple as possible. Additionally, when the number of nodes become large in number with many interconnections and crossings, manual development may be precluded.

Techniques have been devised for automatically drawing directed graphs. For example, in the article in *IEEE Transactions on Systems, Man, and Cybernetics*, Vol. SMC-11, No. 2, February 1981, at pages 109-125, K. Sugiyama et al. describe a technique where nodes are placed in ranks, ordered within ranks to reduce crossings, and then positions are adjusted to avoid bends in edges. The ordering of nodes within ranks is computed by an iterative heuristic based on the "barycenter" function of node positions. A practical implementation of a variation on the Sugiyama et al. approach is described by L. A. Rowe et al. in the article in *Software: Practice and Experience*, Vol. 17, No. 1, 1986, at pages 61-76.

Improvements to the barycenter method for reducing edge crossings are reported by P. Eades et al. in their article in *ARS Combinatoria*, Vol. 21, No. A, 1986, at pages 89-98. There, a method is described that reduces the number of edge crossings slightly as compared with the barycenter function.

The problem with the prior techniques, however, is that they do not (1) attempt to provide the best rankings of nodes; (2) always produce a satisfactory reduction in the edge crossings within a reasonable period of time; or (3) attempt to improve the final placement of nodes in the drawing after edge crossings are minimized, other than straightening edges.

SUMMARY OF THE INVENTION

The foregoing problem in the prior art has been solved in accordance with the present invention which relates to a technique implemented on a processor, computer or microprocessor for automatically drawing directed graphs that provide appropriately interconnected labeled blocks or nodes with reduced edge crossings and improved picture clarity from a user-supplied block or node interconnection listing. Additionally, the present technique can provide control of the spacing between nodes within a rank order or between ranks, the placement of a node, the size and/or shape or configuration of all or certain nodes, the labeling of interconnections, etc.

Other and further aspects of the present invention will become apparent during the course of the following description and by reference to the accompanying drawings.

DETAILED DESCRIPTION

The present invention is a technique for making a layout of a directed graph from a list of the nodes and edges of the graph where the edges may have an associated integral weight. In the layout, nodes are drawn as shapes or icons such as rectangles and ellipses; edges are drawn as lines or splines between nodes. It is to be understood that a tail node is defined as the originating end of an edge, while a head node is defined as the termination of the edge, customarily indicated by an arrowhead.

Figure 1:
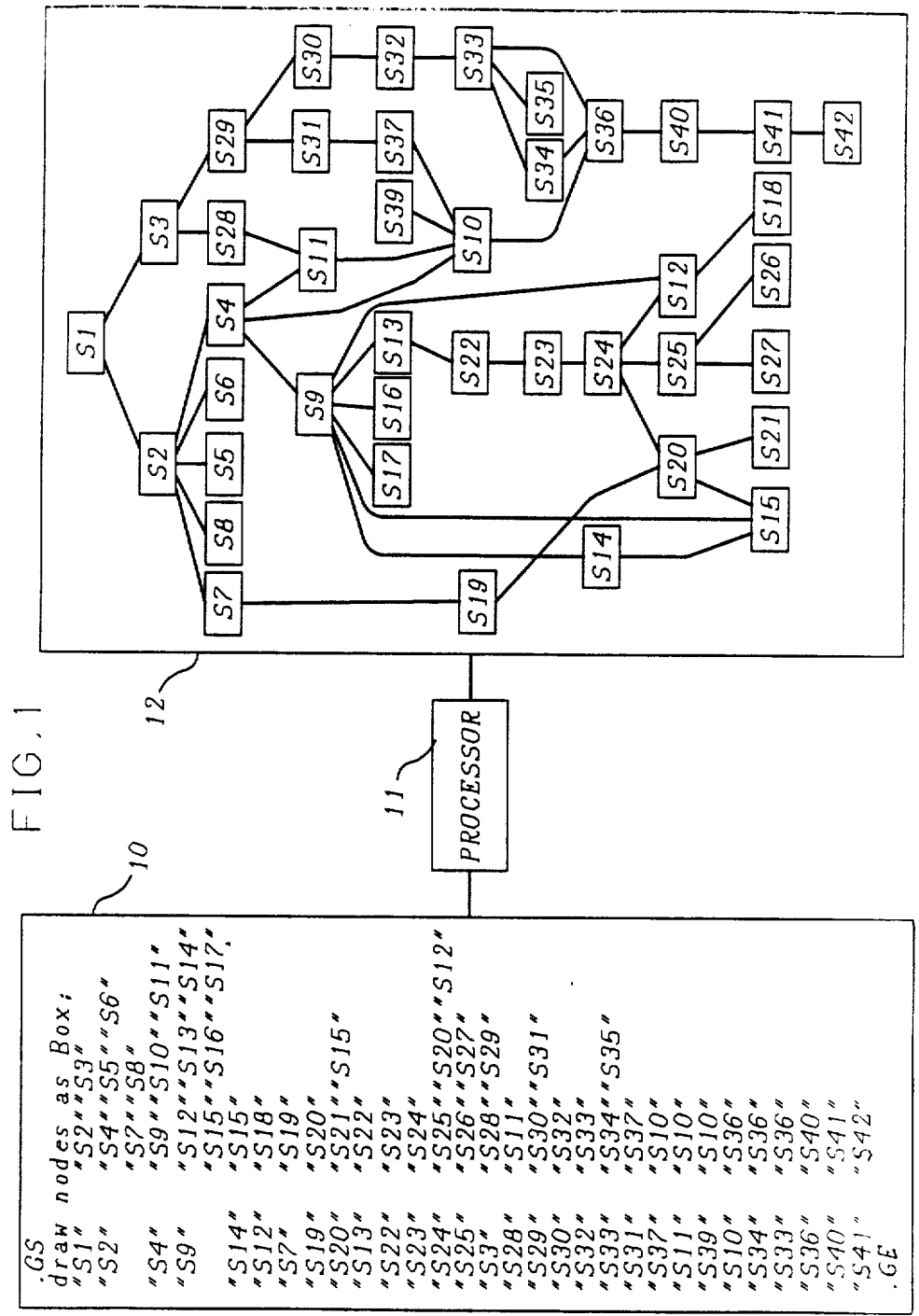
FIG. 1 is a block diagram of an exemplary implementation of the present invention, taking as an input a node interconnection description which is automatically processed by the processor to produce a directed graph output.

FIG. 1 illustrates an exemplary input sequence of the present invention where an edge list description 10 of a directed graph is provided by a user of the technique as an input for a processor 11. This is also shown as block 100 in the overall flow diagram of FIG. 6. Processor 11 reads this graph description 10, computes a layout of the described directed graph using a process comprised of several steps to be described hereinafter, and produces a description of the layout in a computer graphics language, such as PIC or PostScript, which language is used to generate instructions for controlling a peripheral device to draw a picture as illustrated in directed graph 12, or provides a layout to an external process that may further refine or modify the layout, such as computing coloring or shading, finding clusters of nodes in the layout, etc. It is to be understood (1) that processor 11 can comprise any well known computer or microprocessor, (2) that PIC is a language for typesetting graphics as described in the article by B. W. Kernighan in *Software-Practice And Experience*, Vol. 12, No. 1, 1982 at pages 1-21, and (3) that PostScript is a similar computer language as described in Adobe Systems, "PostScript Language Reference manual", published by Addison-Wesley, 1985. The present technique operates best for producing layouts of acyclic directed graphs, which are often used to represent hierarchical relationships.

In the exemplary graph description of FIG. 1, the first and last lines that read ".GS" and ".GE" indicate the Graph Start and Graph End, respectively, of the description 10. If the edges of the resultant layout should point from left-to-right rather than top-to-bottom as shown in directed graph 12 of FIG. 1, then a line ".GR" (Graph Rotate) is substituted for the line ".GS". the second line of the edge list description 10 indicates that the nodes are to be drawn as boxes, rather than some default configuration as, for example, a circle, an ellipse, a diamond, etc. It is also possible to designate the size of the node representation in inches, if the default size is not desired. If the default node drawing shape and size are desired, then no "draw" command need be given. The third line of the edge list description 10 starts the edge listing and indicates that the node "S1" is a tail node name, and that nodes "S2" and "S3" are two head node names connected to node "S1". As shown in resultant directed graph 12, the block or node labeled "S1" has a separate connection to each of lower ranking blocks or nodes labeled "S2" and "S3". Similarly, the next line of the edge list description 10 indicates that tail node "S2" has separate connections to each of labeled head nodes "S4", "S5", "S6", "S7", and "S8" in the next lower rank and are also shown in directed graph 12 of FIG. 1. The remaining lines of edge list description 10 can be similarly correlated to the interconnections between the listed tail and head nodes shown in directed graph 12.

In accordance with the present invention, processor 11 receives the edge list description 10 and performs the following functions or steps. In a first step, the graph description is used to construct an input graph of attributed nodes and edges. Such first step, hereinafter termed the "parser", translates the edge list descriptions into appropriate internal representations in memory of processor 11 as shown by block 101 of FIG. 6. The parser and internal graph representation employ standard techniques.

In a second step, the graph constructed by the parser is passed to a layout procedure which creates the layout of the graph by setting X and Y coordinates of the center points of nodes, and X and Y coordinates of spline control points of the edges. Such second step includes five substeps as shown by blocks 102-106 of FIG. 6 which will be discussed in greater detail hereinafter.

Figure 6:
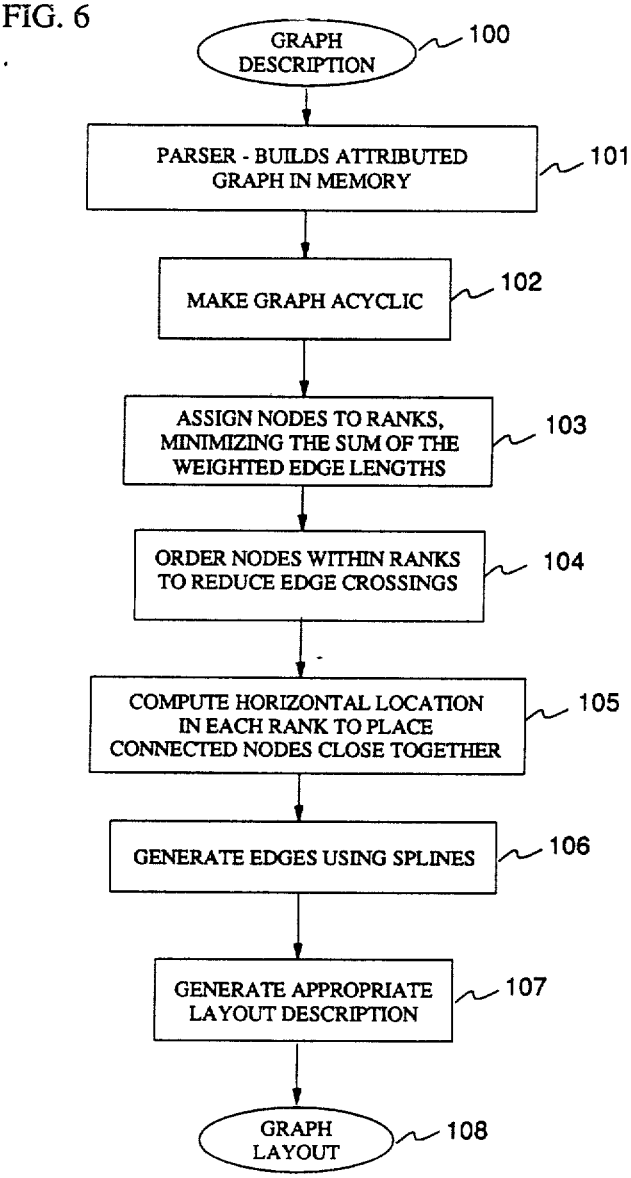
FIG. 6 is a flow diagram of an exemplary process for use in the processor of FIG. 1.

A third step then converts the resultant attributed graph into appropriate code for drawing the directed graph 12 or for use by another process or processor, as shown by block 107 of FIG. 6. This appropriate code is then used to draw the directed graph 12 as shown by block 108.

As mentioned above, the second step performed by processor 11 can comprise five substeps or passes. The first substep, corresponding to block 102 of FIG. 6, removes any directed cycles in the graph. This is accomplished by performing as many iterations as necessary to reverse edges until no cycles remain. Each iteration starts by assigning to each edge a count of 0. Then, a standard graph search such as a breadth-first or a depth-first search is performed. Whenever a cycle is detected during the search, all edges on the cycle receive an additional count of 1. When the search finishes, an edge with a maximum count is selected and its direction is reversed. In the final representation, however, each reversed edge is returned to its original orientation.

A second substep or pass, corresponding to block 103 of FIG. 6, finds an optimal rank assignment for the nodes. An optimal rank assignment assigns integer ranks to nodes such that the sum of the "costs" of edges is minimized. The "cost" of an edge is the product of its weight and its length, where the length is the rank of its head minus the rank of its tail. If the input graph does not supply a weight for an edge, it is assigned a default value, typically the unit value "1". A user may increase the weight of an edge in the input graph presented to processor 11 to favor the shortening of this edge in the layout.

Figure 2:
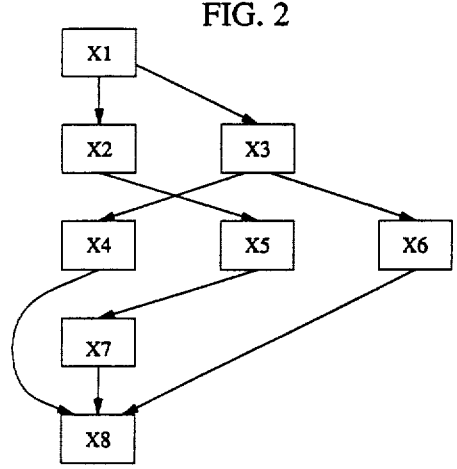
FIG. 2 is a diagram of an intermediate layout of an exemplary directed graph for achieving a layout in accordance with the present invention.
Figure 3:
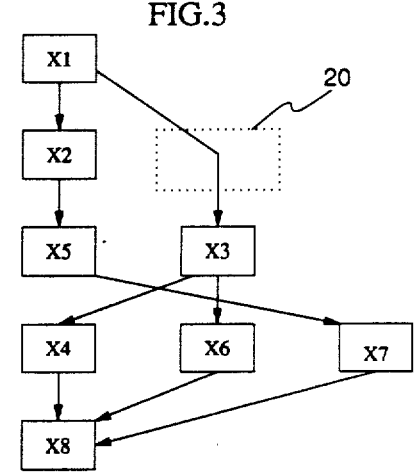
FIG. 3 is a diagram of another intermediate layout of an exemplary directed graph for achieving a layout in accordance with the present invention.

In the exemplary graph of FIG. 2, where all edge weights are "1", the cost of the directed graph is 11. However, the cost of the graph of FIG. 3 is 10. In FIG. 2 the length of the edges between "X8" and each of the nodes "X4" and "X6" is equal to 2, while the cost of the edge from "X1" to "X3" is 1, for a combined edge cost of 5 for these three edges. In FIG. 3 the first two of these edges only have a cost of 1 each while the single edge from "X1" to "X3" has a cost of 2, thereby reducing the overall graph cost to a value of 10. It should be understood that if the X1-X3 edge were assigned a weight of 5 because of its importance, then the directed graph of FIG. 2 would then have the least overall cost.

Constructing an optimal level assignment arises naturally as a major component in a method for drawing directed acyclic graphs because (1) an optimal level assignment minimizes the amount of edge stretching to enhance the clarity of the resulting layouts, and (2) an optimal level assignment may decrease the running time of subsequent passes of the graph layout algorithm, if this running time is proportional to edge lengths.

The optimal rank assignment problem can be formulated as an integer program as follows:

$$\min \sum_{(v,w) \in E} \omega(v,w)(\lambda_w - \lambda_v) \quad (1)$$

where the $\lambda_v$ are integers, $\lambda_w - \lambda_v \geq 1$ for all edges (v,w), and $\omega(v,w)$ is the weight of edge (v,w). In this form, this substep can be solved by general solution techniques in linear programming.

The present invention uses a more efficient network simplex method. To describe this technique, the following notation will be used. A spanning forest T can be used to derive an integer valued function $\lambda$ on the nodes of the graph. The function can be characterized by requiring that, if (v,w) is an edge in T, then $\lambda_w = \lambda_v + 1$. If this function satisfies the conditions of a rank assignment, T is called feasible. For a given rank assignment, the slack of an edge is the length of the edge minus 1. This corresponds to how far the edge can shrink before it cannot be shrunk any more. The skeleton of a graph, relative to a given rank assignment, is the subgraph induced by all edges with slack equal to 0.

For a given feasible spanning forest of a graph, each edge can be assigned a value. If an edge "e" is not in the forest, the value is defined to be 0. If the edge is in the forest, its removal splits the tree containing it into two pieces. The value of "e" is defined to be the sum of the weights of all edges going from the piece of the tree containing e's tail to the piece containing e's head, minus the sum of the weights of all the edges going in the opposite direction. The edges occurring in the subtraction term are denoted IN(e).

Figure 7:
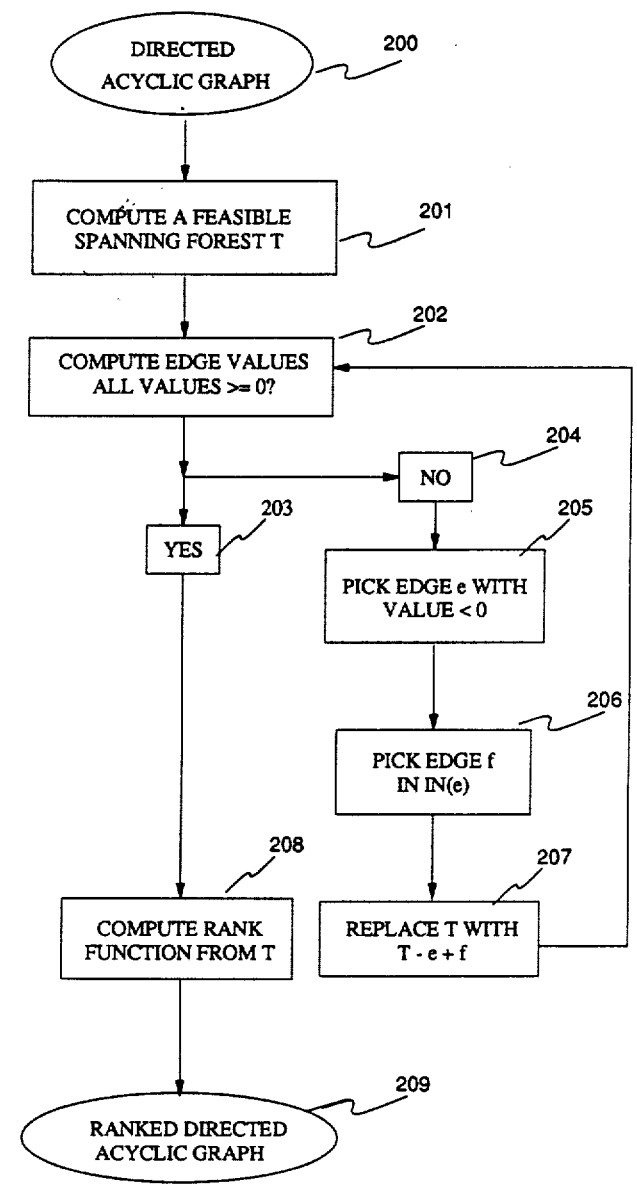
FIG. 7 is a flow diagram of the network simplex method according to a preferred embodiment of the present invention.

The network simplex method is shown in FIG. 7. Given a weighted directed acyclic graph, a feasible spanning forest T is constructed (block 201). The manner for doing this will be explained more fully below. Then the value of each edge, as defined above, is computed. If some edge "e" has negative value, an edge "f" in IN(e) is chosen, and a new forest is generated by removing "e" and inserting "f". Then the values of the edges are recomputed and another edge with a negative value is searched for as shown by blocks 205–207 in FIG. 7. This iteration continues until the value of each edge is non-negative. To compute the rank function from the final T (block 208), for each tree in T, do a standard breadth first search through the tree, starting at some arbitrary node and assigning it an arbitrary rank. Each time a new node is scanned, it is assigned the rank of the node currently being visited, plus or minus 1, depending on whether the scanned node is the head or tail node, respectively, of the edge between it and the visited node. Finally, the rank assignment for each tree is shifted to make the smallest rank equal to 0.

Figure 8:
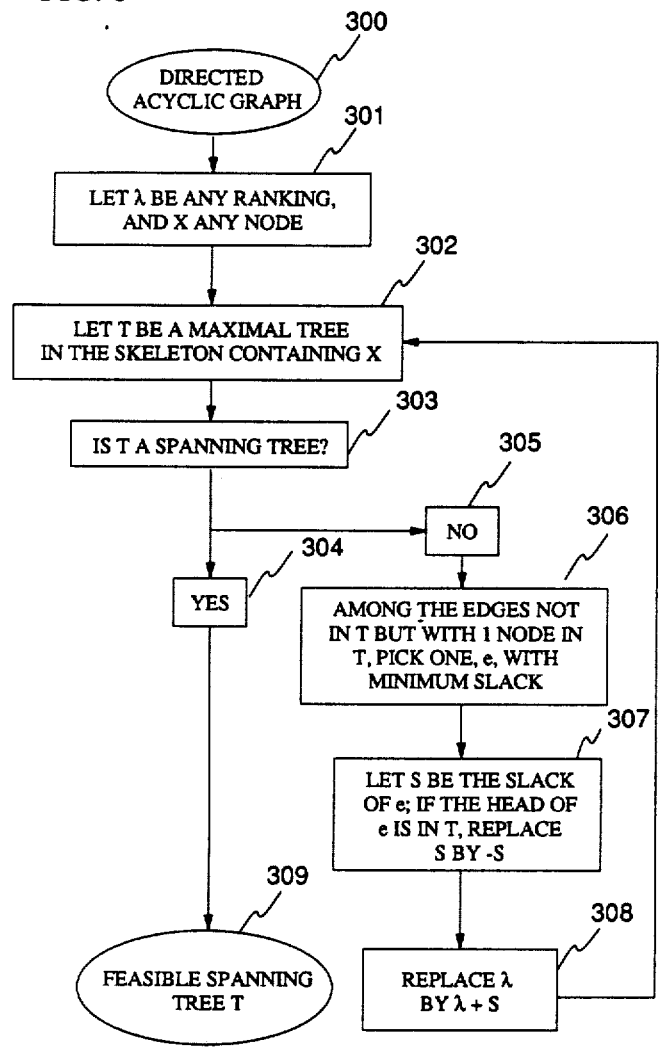
FIG. 8 is a flow diagram of the computation of a feasible spanning forest T in FIG. 7 in accordance with a preferred embodiment of the present invention.

To construct a feasible spanning forest (block 201), it suffices to construct a feasible spanning tree for each connected component of the underlying undirected graph. This technique is outlined in FIG. 8. Pick any rank assignment $\lambda$ and pick some node x as shown by block 301. Let T be a maximal tree in the skeleton containing x as shown by block 302. If T is a spanning tree, it is a feasible spanning tree as shown by block 309, and the process continues on to block 202 of FIG. 7. Otherwise, there exists an edge not in T but with one of its nodes in T. Of all such edges, one, say "e", is selected with the least slack S as shown by block 306. If the head of "e" is in T, replace S by $-S$ as shown by block 307. Each node v in T is given the new rank $\lambda_v + S$ as shown by block 308. A new maximal tree T is then computed and the process iterates. At some point, a feasible tree is attained as in block 309.

Following the rank assignment, the second substep, in block 103 of FIG. 6, also creates dummy nodes at places where long edges cross ranks, as, for example, at the level of node X2 for edge X1-X3 in FIG. 3 designated dummy node 20. The placement of dummy nodes determines edge crossings and is also an aid to drawing splines for long edges in a later step, indicated by block 106 of FIG. 6. Consequently, optimal rank assignments are important not only for their contribution to drawing quality, but also for minimizing the number of dummy nodes and reducing the number of edge crossings and the cost of subsequent passes. This substep also reserves space for drawing self-edges to the same node by increasing the width of such nodes.

Figure 4:
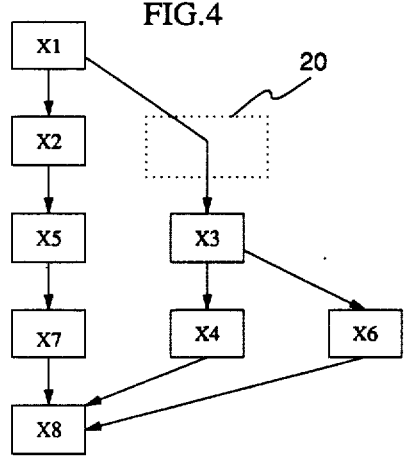
FIG. 4 is a diagram of another intermediate layout of an exemplary directed graph for achieving a layout in accordance with the present invention.

A third substep or pass orders the nodes from left to right within ranks as indicated by block 104 of FIG. 6. Since the order of nodes within ranks determines the number of edge crossings and affects the proximity of connected nodes in the layout, this step reduces the number of edge crossings to accommodate a cleaner layout and to allow connected nodes to be placed more closely together. An example of this technique is shown in FIG. 4 where the nodes of FIG. 3 are rearranged to minimize crossings and, in this exemplary case, to eliminate crossings altogether.

This step is an iterative technique using the present inventive weight function and local optimizations, where the weight function, called a "generalized median", produces less crossings by reducing the effects of widely spread nodes, and is inexpensive to compute. The generalized median heuristic tends to work better if the initial order of noes is good. To enhance this condition, transpositions of adjacent nodes are applied to precondition the inputs to the generalized median method and to further optimize its solutions.

Figure 9:
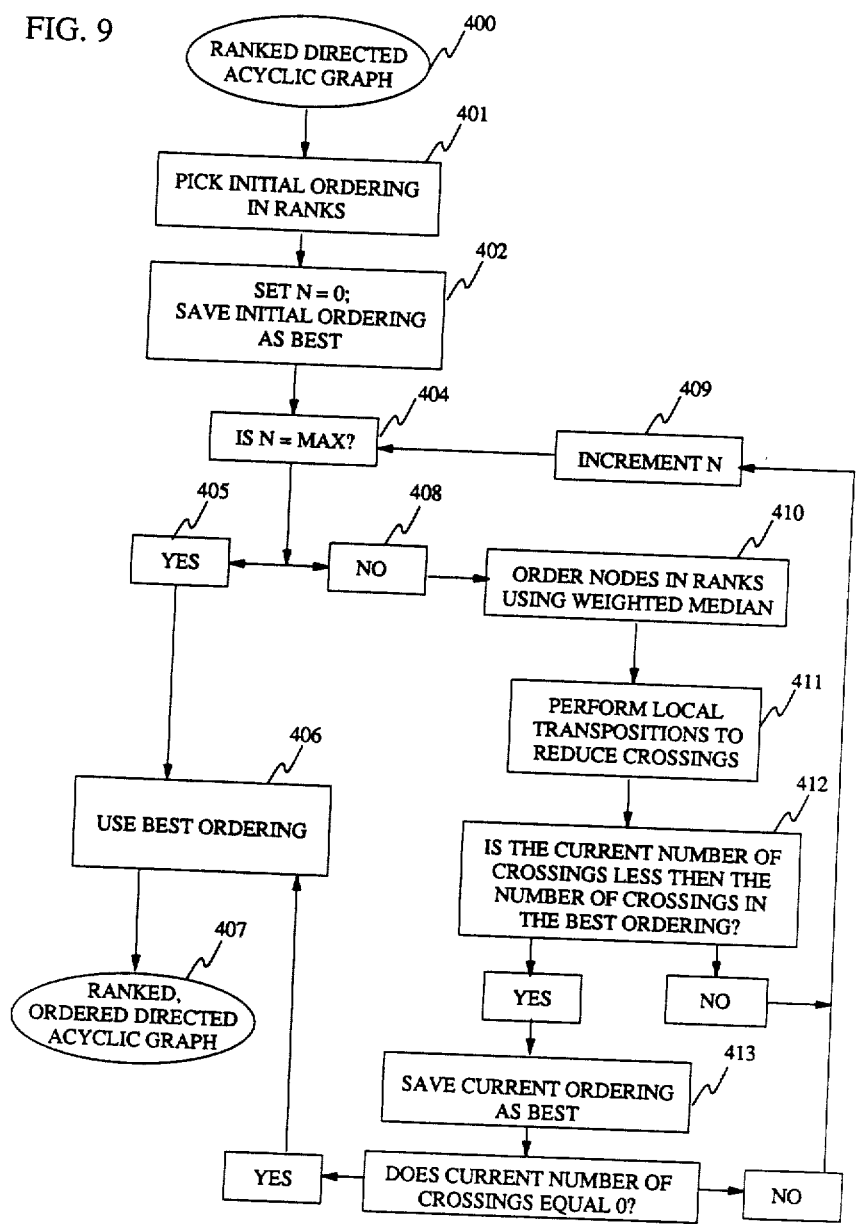
FIG. 9 is a flow diagram of the ordering of nodes within ranks to reduce crossings in the flow diagram of FIG. 6 in accordance with a preferred embodiment of the present invention.

The outline of the third substep is given in FIG. 9. An initial ordering is given the nodes within each rank (block 401). This is done, for example, using a graph search starting from nodes of minimum ranks. Nodes are assigned positions in their ranks in the order that they are searched. This ensures that the initial node ordering of a directed tree has no crossings.

The following two steps, shown by blocks 410 and 411, are then performed a fixed number of times (per blocks 402 and 404 or until there are no more crossings per blocks 414 and 415), producing various orderings within the ranks. The ordering with the least number of crossings is the one finally chosen as shown by blocks 406 and 407.

(1) In block 410, each rank of the graph is visited, going from the lowest rank to the highest rank or from the highest rank to the lowest rank, depending on whether the iteration is even numbered or odd numbered. When visiting a given rank, the generalized median of each node is computed with respect to the adjacent rank visited previously. Then, the nodes in the given rank are sorted according to the generalized median values, except that nodes with no neighbors (i.e., connected by an edge) in the concerned adjacent rank are kept in their current positions. Then, the next rank is visited.

(2) Repeatedly transpose adjacent nodes on the same rank if that decreases the number of crossing as shown by block 411.

The generalized median of a node "v" with respect to an adjacent rank is defined as follows. When v has no neighbors in the concerned adjacent rank, its median value is defined as a negative number (or any number that cannot be a legitimate median value as described next) that the sort phase of step 1 above will recognize as an indicator not to change the position of this node. When the number of neighbors of v in the concerned adjacent rank is odd, the generalized median is simply the position of the neighbor that exactly divides the set of neighbors in the concerned rank into two sets of equal sizes. For example, if the positions of the neighbor of v is 1, 2, 3, 4 and 5, then the median value of this node is 3 as the remaining positions 1, 2, 4 and 5 divide into two sets, namely 1, 2 and 4, 5, with equal size. When the number of neighbors of v is even, there are two median positions in the positions of the neighbor nodes. These are called the left median and the right median respectively. The generalized median value can be any number between the left and right median values. It is generally chosen to be closer to the side where nodes are closer to one another. An exemplary definition for this case follows. Let L be the sorted set of positions of neighbors of v that are smaller or equal to the left median. Likewise, let R be the sorted set of positions of neighbors of v that are larger or equal to the right median. Let $M_L$ be the sum of differences in successive positions in L, and $M_R$ be the sum of differences in successive positions in R. If $M_L$ or $M_R$ is 0, the generalized median value of node v is defines as $(L+R)/2$; otherwise, it is defined as $(M_L*R + M_R*L)/(M_L + M_R)$.

Figure 5:
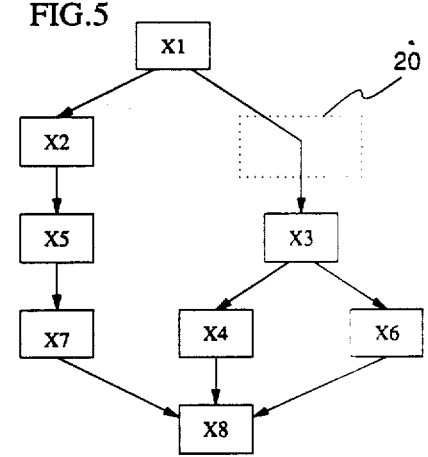
FIG. 5 is a diagram of another intermediate layout of an exemplary directed graph for achieving a layout in accordance with the present invention.

The fourth substep or pass assigns layout coordinates to the nodes, as indicated by block 105 of FIG. 6, respecting the ordering determined by the previous pass. The coordinates indicate the center points of nodes. A final exemplary layout is shown in FIG. 5. The assignment of x coordinates to the nodes can be formulated as a set of linear constraints and an objective function involving absolute values to be minimized. Specifically, it is desired to compute the x-coordinate $x_v$ for all nodes v minimizing $$\sum_{(v,w)\in E} \omega(v,w)\Omega(v,w)|X_w - X_v| \quad (2)$$

such that $x_v - x_u \geq \delta$ whenever node u is to the left of node v on the same rank. Here, $\delta$ is a separation factor chosen to appropriately separate adjacent nodes on the same rank. The edge factors $\Omega$ distinct from the edge weight $\omega$ supplied by the user, are chosen to encourage the straightening of long edges and paths. For example, the $\Omega$ factor for an edge between dummy nodes is chosen to be larger than the $\Omega$ factor for another edge where only one of the nodes is a dummy node.

There is a standard technique for transforming this optimization problem into a linear program by the introduction of extra variables, allowing the coordinates to be computed by standard procedures such as the simplex method. Although this technique is practical for some graphs, it takes an undesirable amount of time and memory to solve for x coordinates in other graphs. In the present invention, the fourth substep of block 105 may be optionally replaced by a substep that produces an approximate solution based on local optimization techniques.

Figure 10:
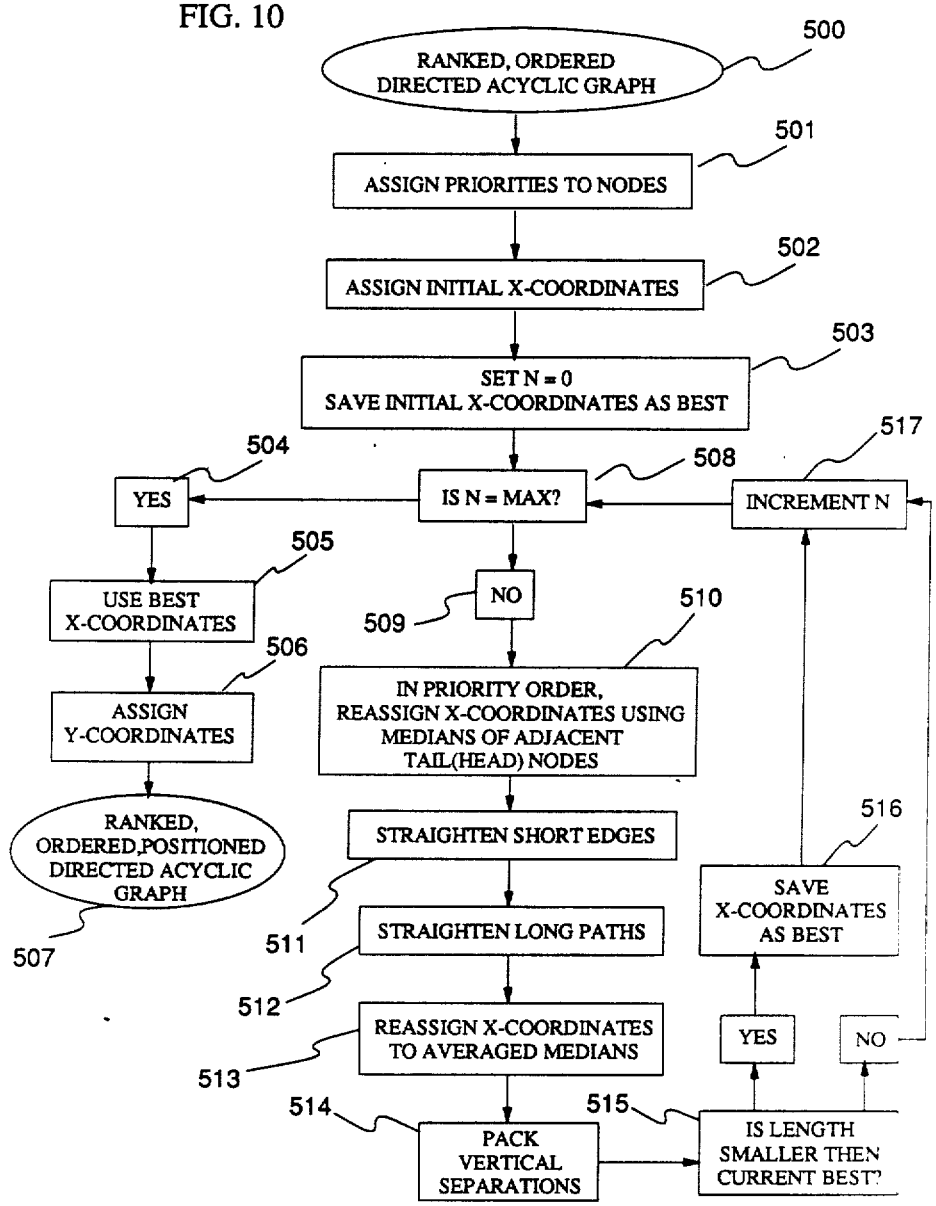
FIG. 10 is a flow diagram of a local optimization technique for use in computing the horizontal locations in each rank to place the connected nodes close together in accordance with a preferred embodiment of the present invention.

An outline of the local optimization technique for computing x coordinates for nodes is given in FIG. 10. This technique starts by assigning priorities to nodes (block 501). The priority of a node is defined as a weighted sum of its out-edges or in-edges. The weight of an edge is the product of its $\omega$ and $\Omega$ values as discussed for equation (2). Higher priority nodes are assigned coordinates before lower priority nodes. Subsequently, nodes are assigned initial x coordinates (block 502). These coordinates can be chosen simply as follows. The leftmost node in a rank has x coordinate 0. The second node has coordinate defined by the separation factor $\delta$, and so on.

Then a fixed number of iterations, using blocks 508 to 517, is performed. After each iteration, the total sum of all weighted edges are computed and the set of coordinates with minimum edge sum is saved (block 516). In each iteration, the following five substeps are performed.

(1) Each rank is visited going from the lowest rank to the highest rank, or vice versa, depending on whether the iteration is even-numbered or odd-numbered. In each rank, according to its priority order, each node is reassigned a new x-coordinate using the median value of x-coordinates of either tail nodes of in-edges or head nodes of out-edges, depending on the direction it is going from the lowest rank to the highest rank, or vice versa (block 510).

(2) Edges with both ends being real nodes are set as straight as possible (block 511).

(3) Paths where internal nodes all have a single in-edge and a single out-edge are straightened if possible (block 512).

(4) the x-coordinate of each node is reassigned using the median value of the positions of tail nodes and head nodes of all edges incident on it. If there are two medians, the average value is used (block 513). This enhances the local symmetry and makes the resulting picture or directed graph drawing more pleasant looking.

(5) In substep 1 (block 510), nodes can sometimes drift apart creating vertical blank areas in the picture. This fifth substep (block 514) shifts such nodes closer to one another.

After the x-coordinates have been assigned, nodes in the same rank are assigned the same y-coordinates. The y-coordinates are chosen to appropriately separate the ranks from one another (block 507). If there are two adjacent ranks with a connecting edge whose end points are far apart, the separation between the ranks can be increased to avoid drawing edges almost horizontally.

The last substep or pass determines spline control points for drawing edges as shown by block 106 of FIG. 6. For each spline, this requires the consideration of whether the spline corresponds to a self-edge to the same node; an edge between nodes on (i) the same rank, (ii) adjacent ranks or (iii) non-adjacent ranks; with the possibility of multiple edges between the same pair of nodes. The splines are quadratic B-splines as outlined, for example, by M. E. Mortensorr in the book *Geometric Modeling*, Wiley and Sons, 1985. Self-edges to a node are drawn as loops. Where there are multi-edges they are nested, with an equal number (plus or minus one) on either side of the node.

Edges between nodes on the same rank are drawn as lines or smooth arcs. A line is preferred if thee are no nodes between the endpoints of the edge. Otherwise an arc is drawn in the space above the rank, using approximately one-third of the separation between ranks. Where there are multiple edges between nodes of the same rank, these multiple edges are separated by adjusting the various centerpoints of the arcs upward or downward accordingly.

Edges between nodes on adjacent ranks are drawn as a straight line. Long edges have endpoints on nonadjacent ranks are drawn using a sequence of connecting splines since they may pass near other nodes and change direction. The control points for the connecting splines are chosen for smoothness while avoiding incorrect node intersections and unintended edge crossings. Dummy nodes are created with height about 20% higher than the highest non-dummy node in the same rank, and with a width about twice the default node separation, as shown, for example, for dashed-line dummy node 20 in FIG. 3. This reserves enough space to make a spline inside the boundaries of the dummy node, if necessary. Alternately, if there is a space next to the dummy node, it is often preferable to encroach on that space to draw a smoother spline.

Figure 11:
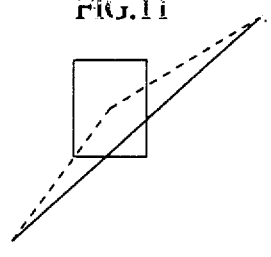
FIG. 11 illustrates a technique used in the edge drawing procedure for edges disposed in various locations in a directed graph in accordance with the present illustration.
Figure 12:
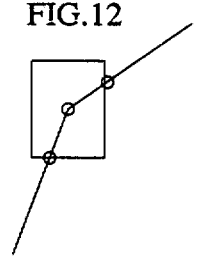
FIG. 12 illustrates another technique used in the edge drawing procedure for edges disposed in various locations in a directed graph in accordance with the present illustration.
Figure 13:
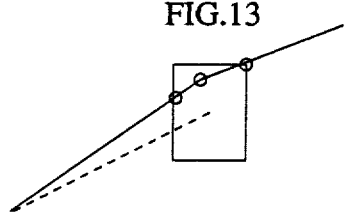
FIG. 13 illustrates another technique used in the edge drawing procedure for edges disposed in various locations in a directed graph in accordance with the present illustration.
Figure 14:
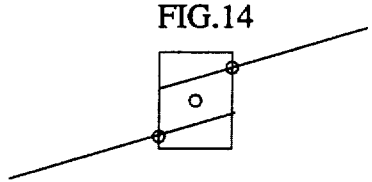
FIG. 14 illustrates another technique used in the edge drawing procedure for edges disposed in various locations in a directed graph in accordance with the present illustration.
Figure 15:
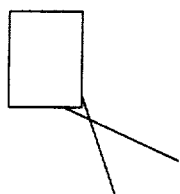
FIG. 15 illustrates another technique used in the edge drawing procedure for edges disposed in various locations in a directed graph in accordance with the present illustration.
Figure 16:
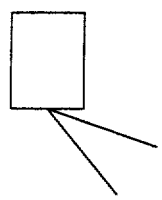
FIG. 16 illustrates another technique used in the edge drawing procedure for edges disposed in various locations in a directed graph in accordance with the present illustration.

For each long edge, the edge drawing procedure examines the sequence of dummy nodes from the lowest to the highest rank, to select spline control points that correspond to the passage of the edge through the dummy node. Every dummy node has two neighbor nodes to which it is connected, and thus two incident edge segments. The spline control points for a dummy node are computed as follows. First, if a straight line between the centers of the neighbors of the dummy node does not intersect any other node or change the order of edge crossings, then the dummy node is deleted as shown in FIG. 11. This avoids small bumps in the edges. Second, for each incident edge segment, a line segment connecting the centerpoint of the dummy node to a point on the neighboring node is computed. If the neighboring node is also a dummy node that has already been visited, then its spline control point closest to the node under consideration is chosen, otherwise the centerpoint of the neighboring node is taken. Third, for each of these line segments, if the segment intersects the bounding box of any node in the same rank as the dummy node, then the endpoint of the line segment is adjusted upward or downward, toward the rank of the neighboring node as appropriate, to eliminate such intersection. Fourth, if the extensions of the line segments intersect inside the dummy node box, the points where the segments intersect the boundary of the dummy node box and the point of intersection are chosen as spline control points as shown in FIG. 12. Fifth, if the line segments can be adjusted so they intersect within the dummy node box without accidentally intersecting the bounding box of any node in the same rank, that is done as shown in FIG. 13 and spline control points are determined as in the fourth part above. Sixth, if the segments cannot be adjusted to intersect but the angle between them is acute, the points where the segments intersect the boundary of the dummy node box and the midpoint of the side of the dummy node box that is opposite the neighboring nodes, are chosen as spline control points. Seventh, if the angle between the segments is obtuse, and the present technique chooses the points where the segments intersect the boundary of the dummy node box and the midpoint of the dummy node box as the spline control points, then the spline has two points of inflection as it passes through the dummy node, which is not as smooth as the other cases that have only one, but the extra turn is necessary when an edge makes a "jog" as it passes through a rank near other nodes as shown in FIG. 14. Eighth, moving an edge may create an edge intersection near an incident real (non-dummy) node, as in FIG. 15. Such intersections are eliminated by sorting the incident edges according to the x-coordinates of the other endpoints, and moving their nearby endpoints slightly as shown in FIG. 16. Ninth, when there are multiple edges between the same pair of nodes that are not long edges, the centerpoints of the splines are moved so the multiple edges are well separated.

We claim:

1. A method of making a layout of a directed graph on a computer or microprocessor of any type from a list of nodes and weighted edges of the directed graph, the method comprising the steps of:
   (a) reversing the direction of a subset of edges to break any cycles between nodes in the graph;
   (b) ranking the nodes to minimize a weighted sum of all the lengths of edges in the directed graph, where the length of an edge is the difference in the ranks of its two interconnected nodes and the weighted sum is the sum of the product of the weight and length of each edge;
   (c) ordering nodes within their ranks using any combination of (1) a generalized median value and (2) exchanging adjacent nodes to reduce edge crossings, where the generalized median value of a node is defined to be the median position of the neighbor nodes to which the node is connected in an adjacent rank if the number of neighbor nodes is odd, or a median value between the left and right median position of its neighbor nodes when the number of neighbor nodes is even;
   (d) assigning y-coordinates and x-coordinates to nodes of the directed graph so that nodes on the same rank receive the same y-coordinate and adjacent ranks are appropriately separated, and the x-coordinates minimize the weighted sum of $L_1$-lengths of edges while maintaining the relative order and a minimum separation of nodes within the same rank, where an $L_1$-length of an edge is the difference in the x-coordinates of its two interconnected end nodes;
   (e) generating spline control points for edges by selecting the control points to avoid incorrect node-/edge intersections and sharp turns;
   (f) generating a representation of a layout of the directed graph for a computer peripheral device or another processor.

2. The method according to claim 1 wherein in step (a) performing the substep of:
   (a1) assigning a predetermined count value for each edge in the directed graph;
   (a2) performing a standard graph search, such as a depth-first search or a breadth-first search, and increasing the counts for each edge in any cycles found during the search;
   (a3) selecting an edge with the largest count and reversing its direction;
   (a4) repeating step (a1) to (a3) until no cycles remain in the directed graph.

3. The method according to claim 1 wherein in step (b) performing the substeps of:

(b1) computing an initial ranking of nodes so that, in every connected component of the directed graph, there is a spanning tree whose edges all have a length equal to one;

(b2) computing auxiliary tree edge values such that when the ranking is optimal, all values are non-negative, otherwise some value is negative;

(b3) finding a tree edge with a negative auxiliary value, exchanging the tree edge with a suitable non-tree edge and adjusting the node ranking;

(b4) reiterating substeps (b2) to (b3) until all tree edges have non-negative auxiliary tree edge values.

4. The method according to claim 1 wherein in step (c) performing the substeps of:

(c1) selecting a rank and computing a generalized median value for each node in the rank, where a generalized median of a node is one of: (1) the median value of all nodes connected to this node in a lower or higher rank when the number of nodes involved is odd, or (2) a value between the two median values when the number of nodes involved is even, or (3) a predetermined value if there are no neighbor nodes;

(c2) sorting the nodes in a rank according to their generalized median values while fixing the positions of nodes whose values are that of case (3) of step (c1);

(c3) exchanging pairs of adjacent nodes within a rank when such exchanging of nodes reduces the number of crossings;

(c4) reiterating steps (c1) to (c3) a predetermined number of times and selecting the best ordering of nodes found during such iterations.

5. The method according to claim 1 wherein in performing step (d) to compute the x-coordinates for nodes, performing the substeps of:

(d1) computing an initial set of x-coordinates that respects the relative order of nodes within their ranks;

(d2) assigning priorities to nodes so that high priority nodes will be processed first for reducing the $L_1$-lengths of edges connected to the high priority nodes;

(d3) selecting a rank and assigning new positions to nodes in the rank, in priority order, according to the median value of the positions of neighboring nodes in a lower or higher rank;

(d4) minimizing the $L_1$-length for each edge whose two end nodes are real nodes;

(d5) minimizing the $L_1$-length of paths whose internal nodes have only one in-edge and one out-edge;

(d6) for each node, minimizing the $L_1$-length of edges connected to it;

(d7) packing sets of nodes that were moved apart during step (d3);

(d8) reiterating steps (d3) to (d7) a predetermined number of times and selecting the lowest-cost coordinate assignment as found during the iterations.

* * * * *